(12) United States Patent
Kuo et al.

(10) Patent No.: US 6,495,987 B2
(45) Date of Patent: Dec. 17, 2002

(54) BATTERY MODULE THAT FURTHER SERVES AS A HANDLE FOR A PORTABLE COMPUTER

(75) Inventors: Ming-Chih Kuo, Taipei (TW); Ming-Hsun Chou, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/842,846

(22) Filed: Apr. 27, 2001

(65) Prior Publication Data

US 2002/0158601 A1 Oct. 31, 2002

(51) Int. Cl.[7] .............................. H02J 7/00; H01M 2/10
(52) U.S. Cl. .................. 320/107; 320/112; 320/114; 429/96; 429/100; D13/103
(58) Field of Search ................................ 320/107, 112, 320/114; 429/96, 98, 99, 100; D13/103

(56) References Cited

U.S. PATENT DOCUMENTS 5,293,300 A * 3/1994 Leung ........................ 361/683
5,494,058 A * 2/1996 Chan ........................... 132/228
5,642,258 A * 6/1997 Barrus et al. ............... 361/683
6,224,997 B1 * 5/2001 Papadopoulos .............. 429/99

* cited by examiner

Primary Examiner—Gregory J. Toatley, Jr.
(74) Attorney, Agent, or Firm—Pillsbury Winthrop LLP

(57) ABSTRACT

A battery module for a portable computer includes a tubular battery casing and a pair of battery contacts. The battery casing is adapted to receive a set of battery cells therein. The battery casing is adapted to be mounted on one side of the portable computer and is configured so as to form a finger hole with the portable computer, thereby permitting gripping of the battery casing for carrying the portable computer. The battery contacts are mounted on the battery casing and are adapted to establish electrical connection between the portable computer and the set of battery cells in the battery casing.

7 Claims, 4 Drawing Sheets

BATTERY MODULE THAT FURTHER SERVES AS A HANDLE FOR A PORTABLE COMPUTER

BACKGROUND OF THE INVENTION

1. Field of the Invention

The invention relates to a battery module, more particularly to a battery module that further serves as a handle for a portable computer.

2. Description of the Related Art

FIG. 1 illustrates a conventional battery module 13 for a notebook computer 1. The battery module 13, which has a rectangular casing, has one end provided with a first connector unit (not shown). The housing 11 is formed with a receiving space at an appropriate location, such as at the front end of the housing 11, for receiving the battery module 13 therein. A second connector unit (not visible) is disposed in the receiving space for connecting electrically with the first connector unit, thereby enabling the battery module 13 to provide electric power to internal circuitry of the notebook computer 1.

Generally, the notebook computer 1 is disposed in a carrying case (not shown) to facilitate carrying of the same from one place to another. However, placing of the notebook computer 1 into the carrying case and removing of the same from the latter result in inconvenience to the user.

It has been proposed heretofore to provide a conventional notebook computer with a handle to facilitate carrying of the notebook computer and to minimize the need for a carrying case. However, the addition of the handle will result in a corresponding increase in the size of the notebook computer.

SUMMARY OF THE INVENTION

Therefore, the main object of the present invention is to provide a battery module that further serves as a handle for a portable computer so as to facilitate carrying of the portable computer without the need for a carrying case and without incurring a substantial increase in the size of the portable computer.

Another object of the present invention is to provide a battery module that can be used to hold the portable computer in an ergonomic position during use.

A further object of the present invention is to provide a battery module that can be detached from the portable computer.

According to this invention, a battery module for a portable computer includes a tubular battery casing and a pair of battery contacts. The battery casing is adapted to receive a set of battery cells therein. The battery casing is adapted to be mounted on one side of the portable computer and is configured so as to form a finger hole with the portable computer, thereby permitting gripping of the battery casing for carrying the portable computer. The battery contacts are mounted on the battery casing and are adapted to establish electrical connection between the portable computer and the set of battery cells in the battery casing.

Preferably, the battery casing is formed with a height padding portion to lift one side of the portable computer relative to an opposite side when assembly of the battery casing and the portable computer is disposed on a worktable.

The battery casing is further provided with a pair of connecting portions adapted for mounting removably the battery casing on the portable computer.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
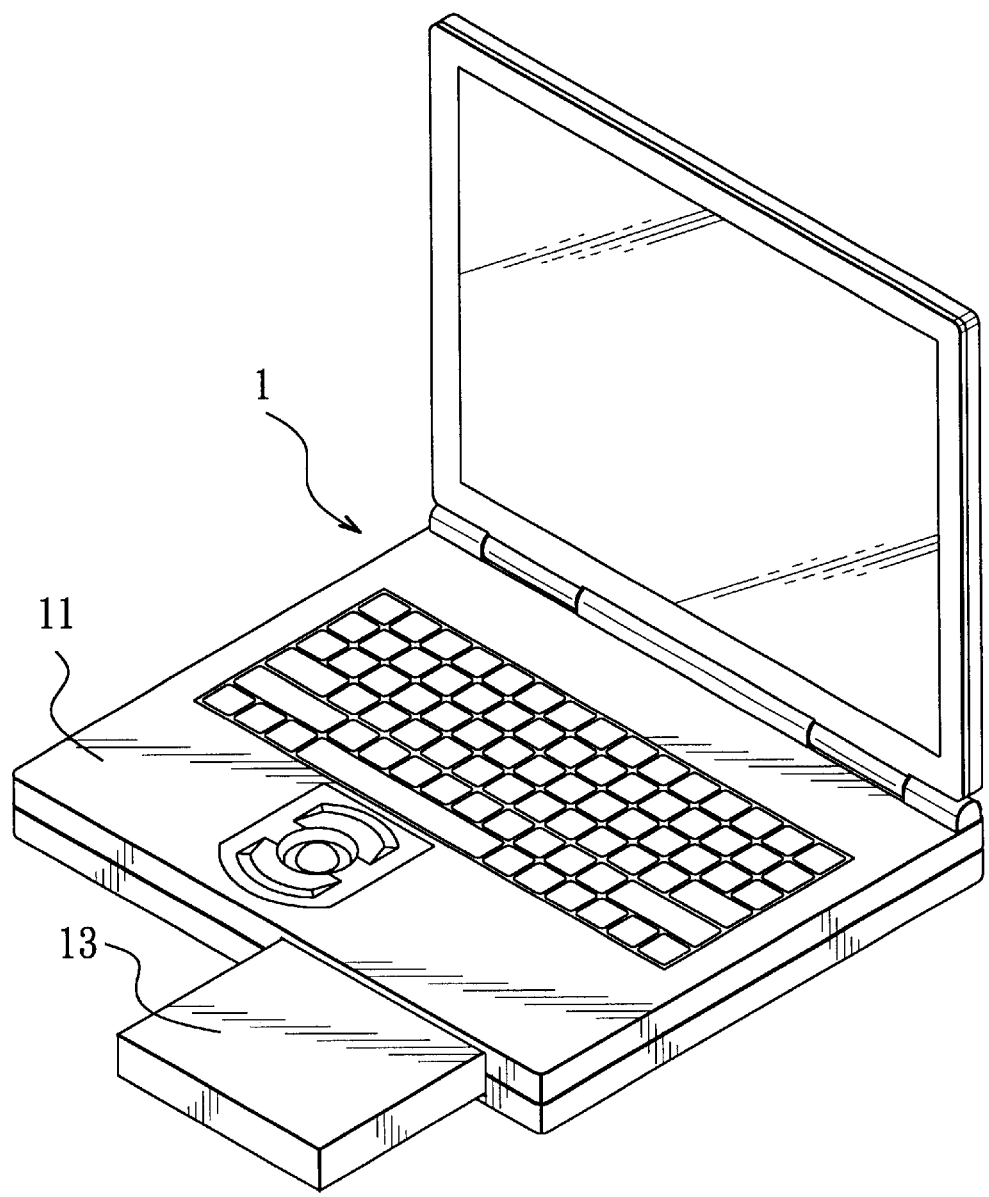
FIG. 1 is a perspective view showing a portable computer with a conventional battery module.
Figure 2:
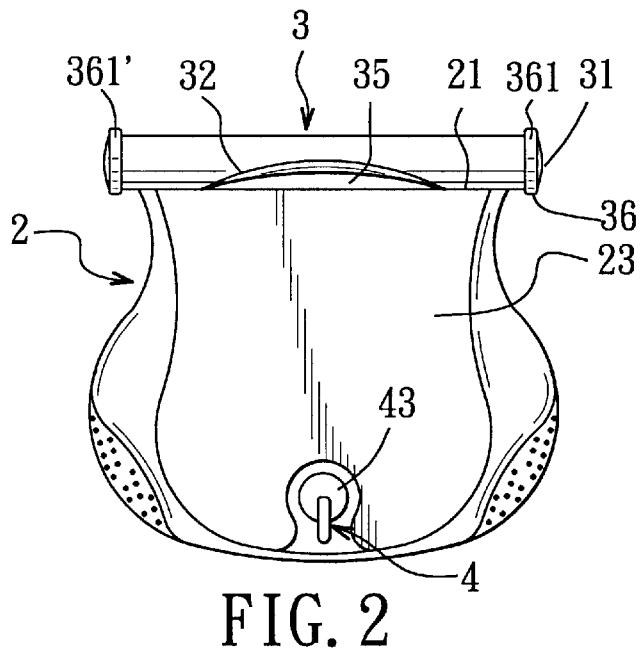
FIG. 2 is a top view of a portable computer that incorporates the preferred embodiment of a battery module according to the present invention.
Figure 3:
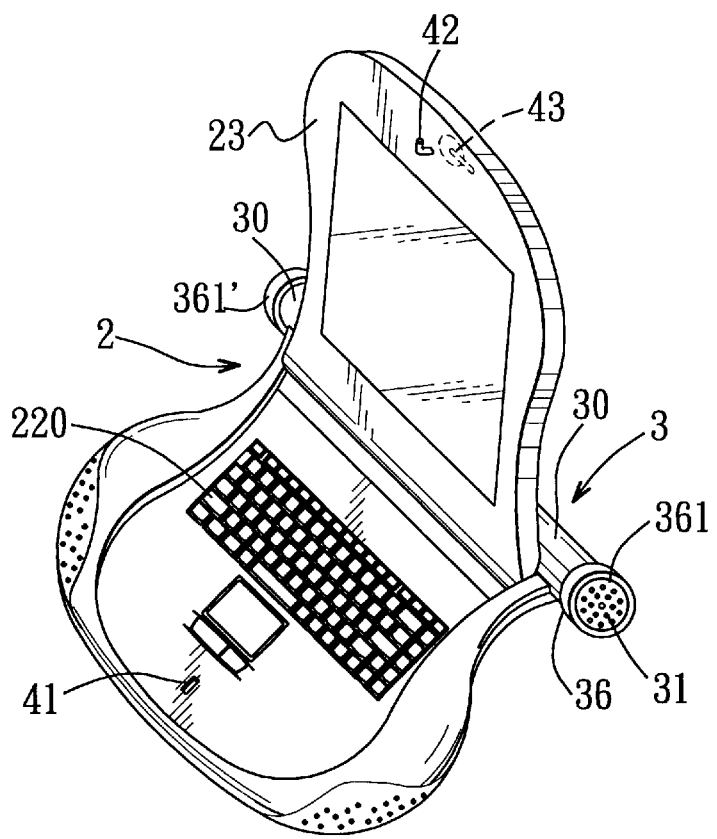
FIG. 3 is a perspective view of the portable computer of FIG. 2.

FIG. 2 illustrates a portable computer 2 that incorporates the preferred embodiment of a battery module 3 according to the present invention. In this embodiment, the battery module 3 is adapted to be mounted on a rear side of the portable computer 2. With further reference to FIG. 3, the portable computer 2 includes a main board module 22 and a display module 23 coupled pivotally to the main board module 22 adjacent to the rear side 21 of the latter. A locking device 4 is provided to retain the display module 23 at a closed position relative to the main board module 22. There are many types of locking devices available in the art suitable for retaining the display module 23 at the closed position. In the embodiment of FIG. 3, the locking device 4 includes a latch hole 41 formed in the main board module 22, a rotary latch member 42 mounted on the display module 23 and to be inserted into the latch hole 41, and a knob 43 disposed at an outer side of the display module 23 and coupled to the latch member 42 for rotating the latter inside the latch hole 41 between a retaining position, where the latch member 42 engages the main board module 22, and a releasing position, where the latch member 42 ceases to engage the main board module 22.

Figure 4:
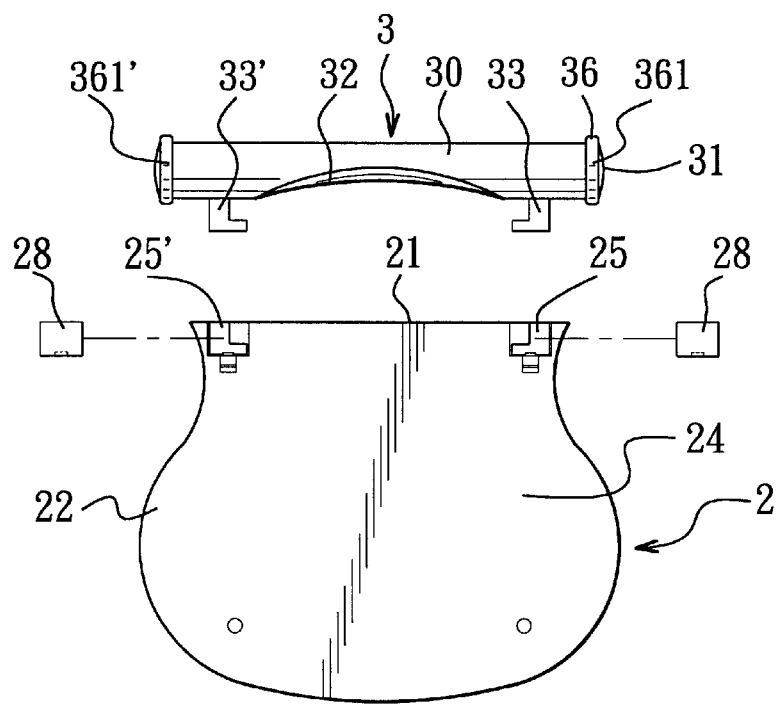
FIG. 4 is a partly exploded schematic bottom view of the portable computer of FIG. 2.
Figure 5:
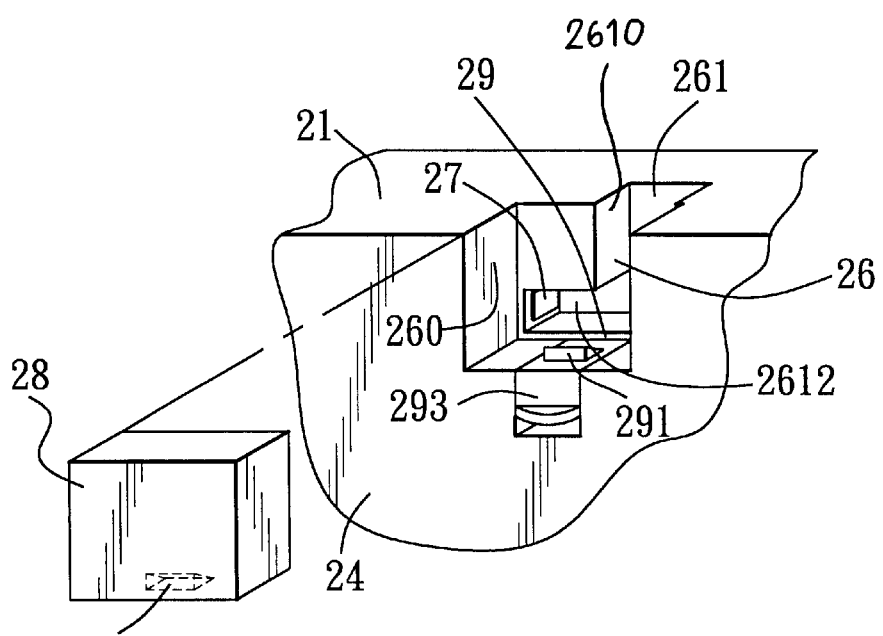
FIG. 5 is a fragmentary perspective view illustrating a latching mechanism on a main board module of the portable computer of FIG. 2.

With further reference to FIGS. 4 and 5, the main board module 22 is formed with a pair of latching units 25, 25' that are preferably disposed adjacent to the left and right sides of the main board module 22, respectively. Each of the latching units 25, 25' includes a groove 26 that is formed in a bottom side 24 of the main board module 22 and that opens to the rear side 21 of the same. The groove 26 is generally L-shaped when viewed from the rear side 21 of the main board module 22, and includes a rectangular first groove portion 260 proximate to the bottom side 24, and a second groove portion 261 distal to the bottom side 24 with respect to the first groove portion 260. The second groove portion 261 is generally L-shaped when viewed from the bottom side 24, and has a narrow section 2610 that opens to the rear side 21 of the main board module 22, and a wide section 2612 that is provided with a conductive power contact 27 therein. Each of the latching units 25, 25' further includes a rectangular cover member 28 that is mounted removably in the first groove portion 260. The first groove portion 260 has a groove bottom formed with a bore 29 that opens to the bottom side 24. A slide button 293 is slidably disposed in the bore 29 and is formed with a latch projection 291 that projects into the first groove portion 260. The cover member 28 is formed with a latch recess 281 that engages the latch projection 291 for retaining releasably the cover member 28 in the first groove portion 260. The slide button 293 is operated to disengage the latch projection 291 from the latch recess 281 when it is desired to remove the cover member 28 from the main board module 22.

The battery module 3 includes a tubular battery casing 30 that is adapted to receive a set of battery cells (not shown) therein. At least one end of the battery casing 30 is provided with a detachable cap 31. The battery casing 30 has a front edge 32 disposed to confront the rear side 21 of the main board module 22 and formed with a pair of L-shaped connecting portions, each of which is adapted to engage the second groove portion 261 of the groove 26 in a corresponding one of the latching units 25, 25'. In this embodiment, each of the connecting portions is provided with a conductive battery contact 33, 33' connected electrically and respectively to positive and negative terminals of the battery cells in the battery casing 30. When the contacts 33, 33' are disposed in the second groove portions 261 of the grooves 26 of the latching units 25, 25', they connect electrically with the power contacts 27 in the grooves 26, thereby establishing electrical connection between the battery module 3 and the portable computer 2 so as to supply electric power to the latter. The cover members 28 prevent untimely removal of the connecting portions from the latching units 25, 25'. It is noted that the particular configurations of the latching units 25, 25' and the contacts 33, 33' can be modified to achieve substantially the same result. Moreover, the portable computer 2 can be connected to a power source via a power cord (not shown) for supplying power to the same in a conventional manner when the battery module 3 is detached from the portable computer 2.

Figure 6:
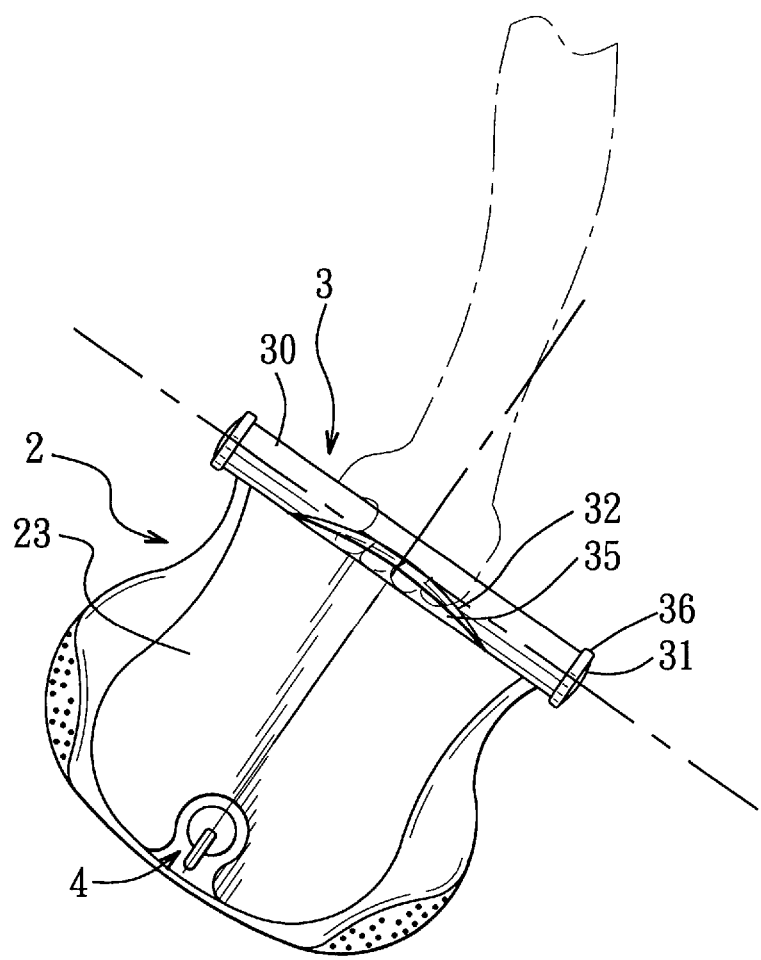
FIG. 6 illustrates how the portable computer of FIG. 2 can be carried from one place to another.

In this embodiment, the front edge 32 of the battery casing 30 is formed with a curved recess. As such, when the battery module 3 is mounted on the portable computer 2, a finger hole 35 will be formed between the front edge 32 of the battery casing 30 and the rear side 21 of the main board module 22. With reference to FIG. 6, the finger hole 35 permits extension of fingers on the hand of the user therethrough when gripping the battery casing 30, thereby facilitating carrying of the portable computer 2.

Figure 7:
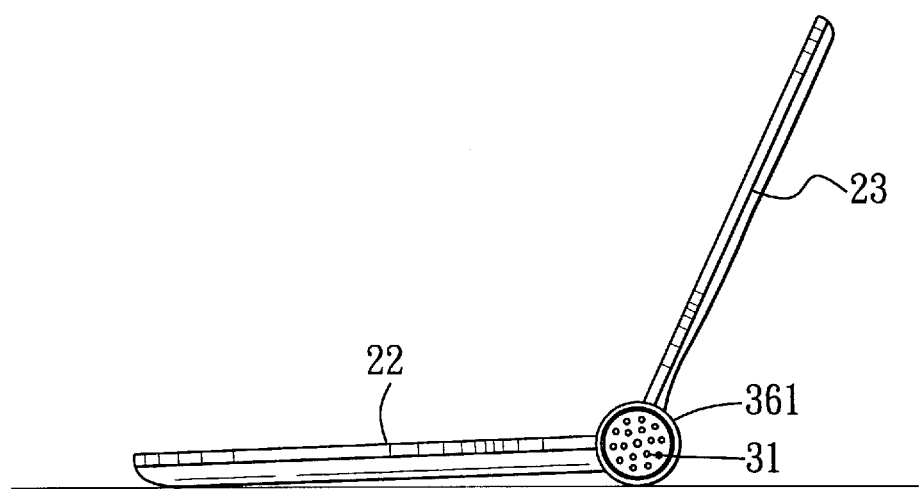
FIG. 7 illustrates the portable computer of FIG. 2 in a state of use.

Preferably, the battery casing 30 has a length slightly longer than that of the rear side 21 of the main board module 22. As such, the opposite ends of the battery casing 30 project in left and right directions relative to the left and right sides of the main board module 22. The battery casing 30 is further formed with a height padding portion 36. In this embodiment, the height padding portion 36 includes an annular rim flange 361, 361' formed on each of the opposite ends of the battery casing 30. The rim flanges 361, 361' have a thickness greater than that of the main board module 22. With reference to FIG. 7, when the portable computer 2 is in use, the battery module 2 and the main board module 22 are disposed on a worktable. The rim flanges 361, 361' lift the rear side 21 of the main board module 22 relative to the front side such that the main board module 22 inclines upwardly and rearwardly from the front side of the main board module 22. This facilitates operation of a keyboard unit 220 (see FIG. 3) that is disposed on the top side of the main board module 22. It is noted that the particular configuration of the height padding portion 36 can be modified to achieve substantially the same result.

It has thus been shown that the battery module 3 according to the present invention can also serve as a handle for a portable computer 2 to facilitate carrying of the portable computer 2 without the need for a carrying case as taught in the prior art and without incurring a substantial increase in the size of the portable computer 2. In addition, the height padding portion 36 of the battery module 3 can hold the portable computer 2 in an ergonomic position that facilitates operation of a keyboard unit 220 during use. The objects of the present invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A battery module for a portable computer, comprising:
 a tubular battery casing constructed and arranged to receive battery cells therein and configured so that it can be mounted on one side of the portable computer and configured so as to form a finger hole with the one side of the portable computer, thereby permitting gripping of the battery casing for carrying the portable computer; and
 a pair of battery contacts mounted on the battery casing and being configured to establish electrical connection between the portable computer and battery cells in the battery casing, the battery casing having one edge that is disposed to confront the one side of the portable computer and that is formed with a curved recess, thereby resulting in the finger hole when the battery casing is mounted on the one side of the portable computer.

2. The portable computer of claim 1, wherein the battery contacts are provided on the connecting portions, and the second groove portions of the latching units are each provided with a power contact for contacting the battery contact on the respective one of the connecting portions so as to establish electrical connection between the battery module and the main board module.

3. The portable computer of claim 1, wherein the connecting portions and the second groove portions are generally L-shaped.

4. A battery module for a portable computer, comprising:
 a tublar battery casing constructed and arranged to receive battery cells therein, the battery casing being configured so that it can be mounted on one side of the portable computer and configured so as to form a finger hole with the one side of the portable computer, thereby permitting gripping of the battery casing for carrying the portable computer; and
 a pair of the battery contacts mounted on the battery casing and arranged to establish electrical connection between the portable computer and battery cells in the battery casing,
 the portable computer having an opposite side opposite to the one side, the battery side of the portable computer relative to the opposite side when assembly of the battery casing and the portable computer is disposed on a surface,
 wherein the battery casing has a length longer than that of the one side of the portable computer, the height padding portion including a pair of rim flanges formed respectively on opposite ends of the battery casing, each of the rim flanges having a thickness greater than that of the portable computer.

5. A portable computer comprising:

a main board module having rear, front, left, right and bottom sides;

a display module coupled pivotally to the main board module adjacent to the rear side; and a battery module including a tubular battery casing constructed and arranged to receive battery cells therein, the battery casing being mounted on the rear side of the main board module and being configured so as to form a finger hole with the rear side of the main board module, thereby permitting gripping of the battery casing for carrying the portable computer, and a pair of battery contacts mounted on the battery casing and capable of establishing electrical connection between the main board module and the battery cells in the battery casing, wherein the battery casing is provided with a pair of connecting portions for mounting the battery casing on the main board module, wherein the main board module is formed with a pair of latching units that engage releasably and respectively the connecting portions, wherein each of the latching units includes:

a groove that is formed in the bottom side of the main board module and that opens to the rear side of the main board module, the groove being generally L-shaped when viewed from the rear side of the main board module, and including a first groove portion proximate to the bottom side, and a second groove portion distal to the bottom side with respect to the first groove portion, the respective one of the connecting portions being removably disposed in the second groove portion; and a cover member mounted removable in the first groove portion for retaining the respective one of the connecting portions in the second groove portion.

6. A portable computer comprising:

a main board module having rear, front, left, right and bottom sides;

a display module coupled pivotally to the main board module adjacent to the rear side; and a battery module including:

a tubular battery casing constructed and arranged to receive battery cells therein, the battery casing being mounted on the rear side of the main board module and being configured so as to form a finger hole with the rear side of the main board module, thereby permitting gripping of the battery casing for carrying the portable computer, and a pair of battery contacts mounted on the battery casing and capable of establishing electrical connection between the main board module and battery cells in the battery casing, wherein the battery casing has a front edge that is disposed to confront the rear side of the main board module and that is formed with a curved recess, thereby resulting in the finger hole when the battery casing is mounted on the main board module.

7. A portable computer comprising:

a main board module having rear, front, left, right and bottom sides;

a display module coupled pivotally to the main board module adjacent to the rear side; and a battery module including a tubular battery casing constructed and arranged to receive battery cells therein, the battery casing being mounted on the rear side of the main board module and being configured so as to form a finger hole with the rear side of the main board module, thereby permitting gripping of the battery casing for carrying the portable computer, and a pair of battery contacts mounted on the battery casing and capable of establishing electrical connection between the main board module and the battery cells in the battery casing, wherein the battery casing is formed with a height padding portion constructed and arranged to lift the rear side of the main board module relative to the front side when assembly of the batter module and the main board module is disposed on a surface, wherein the battery casing has a length longer than that of the rear side of the main board module such that opposite ends of the battery casing project relative to the left and right sides of the main board module, the height padding portion including a pair of rim flanges formed respectively on the opposite ends of the battery casing, the rim flanges having a thickness greater than that of the main body module.

* * * * *